United States Patent
Rommel et al.

(10) Patent No.: US 6,588,490 B2
(45) Date of Patent: Jul. 8, 2003

(54) FOUNDRY CORE ASSEMBLY OF INTERCONNECTED CORES

(76) Inventors: Reiner Rommel, Rosengarten 11, D-68782 Brühl (DE); Jürgen Beyerer, Silcherstrasse 1, D-69234 Dielheim (DE); Mohammed A. Seiraffi, Sauerbruchstrasse 3, D-69723 Schwetzingen (DE)

( * ) Notice: Subject to any disclaimer, the term of this patent is extended or adjusted under 35 U.S.C. 154(b) by 0 days.

(21) Appl. No.: 09/994,329

(22) Filed: Nov. 26, 2001

(65) Prior Publication Data

US 2002/0094410 A1 Jul. 18, 2002

Related U.S. Application Data

(63) Continuation of application No. PCT/DE00/01651, filed on May 23, 2000.

(30) Foreign Application Priority Data

| May 25, 1999 | (DE) | 199 23 856 |
| May 25, 1999 | (DE) | 299 20 419 U |
| Nov. 19, 1999 | (DE) | 199 55 957 |

(51) Int. Cl.$^7$ ............................................. B22C 9/10
(52) U.S. Cl. ........................................ 164/369; 164/339
(58) Field of Search .......................... 164/30, 31, 32, 164/137, 230, 339, 340, 369, 370

(56) References Cited

U.S. PATENT DOCUMENTS

| 4,143,701 A | | 3/1979 | Oshinsky et al. |
| 4,694,883 A | | 9/1987 | Haiduk |
| 5,855,237 A | * | 1/1999 | Okada et al. ................ 164/113 |

FOREIGN PATENT DOCUMENTS

| DE | 31 48 461 C1 | 4/1983 |
| DE | 197 42 276 A1 | 4/1999 |
| EP | 0 083 713 A2 | 7/1983 |
| EP | 0 904 872 A1 | 3/1999 |
| FR | 2 662 218 A1 | 11/1991 |
| JP | 3-18457 | * 1/1991 |
| JP | 5-185181 | * 7/1993 |

* cited by examiner

Primary Examiner—Kuang Y. Lin
(74) Attorney, Agent, or Firm—Alston & Bird LLP

(57) ABSTRACT

Cores (1) are joined to form a core assembly used in foundry practice, with the cores being joined to each other at connecting areas (2) formed by interconnected male and female portions (4, 5). A clamping member (3) is positioned between the male and female portions to produce a clamping effect therebetween.

13 Claims, 2 Drawing Sheets

FOUNDRY CORE ASSEMBLY OF INTERCONNECTED CORES

CROSS REFERENCE TO RELATED APPLICATION

This is a continuation of PCT/DE00/01651 filed May 23, 2000, and designating the U.S.

BACKGROUND OF THE INVENTION

The invention relates to a device for joining all kinds of parts, in particular cores for forming a core assembly, the parts being adapted for insertion into one another with at least one connecting area formed at least in certain regions.

Quite generally, the invention relates to joining all kinds of parts, and to a joining technique, wherein the parts being joined come into mutual surface contact. In most cases, they lie against one another in formfitting engagement, and/or engage one another.

In addition to gluing together the surfaces, it is common to join parts with dowel-type connecting pins. In this connection, it is essential that the parts have suitable recesses, openings, or passages, which are oriented toward one another and in alignment with one another. The connecting pins extend through the recesses, openings, or passages, and are secured therein in force-locking engagement with the parts being joined, thereby interconnecting the parts. Securing of the connecting pins occurs by expansion within the recesses, opening, or passages.

A device of the kind under discussion may also be used, in particular in an advantageous manner, for joining cores into a core assembly, namely in the foundry practice, where for casting all kinds of molded parts, foundry cores or molds are commonly made from separate parts, combined, and joined to a casting mold or a core or mold assembly. These core assemblies are then filled with a molten metal for making, for example, a metallic work piece. In the series production, the core assemblies being filled with the molten metal advance one after the other through a production line.

Core and shell shooting machines for making the cores to be joined have been known from practice for many decades, for example, from DE 31 48 461 C1, which discloses a core and shell shooting machine.

The joining of cores into a core assembly, for example, for casting an engine block, has so far occurred by joining the individual cores by means of screws or tie rods. This is extremely costly because of the manual activity that is required in this instance. Furthermore, it is necessary to eliminate or separate again the screws or tie rods, when removing the cast pieces or when preparing the molding material in this instance mainly sand, including binders.

Furthermore, it is known per se to join cores alternatively with hot-melt adhesives or cold bonding agents. When using hot-melt adhesives, one has to see to it that the kiln temperature be not above the melt point of the hot-melt adhesive during a subsequent passage through a foundry kiln for drying the applied water-based core coating. If so, the adhesive bond would dissolve.

Furthermore, is likewise already known from the prior art to join cores by means of core sand, namely by shooting a so-called key core into hollow spaces provided in the cores being joined, whereby a formfitting engagement is obtained between the respective cores or core parts. This requires a separate shooting operation directly on the already made cores or core parts, which generate quite a considerable expenditure in terms of apparatus.

A device for joining parts, in particular cores for forming a core assembly is also disclosed in DE 197 42 276 A1. This document discloses the use of very special connecting means, namely an expansion body, which is first introduced or inserted with a play into aligning recesses of the parts being joined. In this instance, the expansion body is a so-called expansion element for producing a force-locking engagement between the parts or cores, and one of the recesses is formed in a projection of one of the two parts. The expansion element has the shape of a pin and contains in its wall surface two opposite flats. The expansion element is made of metal, plastic, wood, or even molding sand. For joining the two parts or cores, the expansion element is inserted into the recess provided in one of the two parts. The other part is placed on the projecting portion of the expansion element or slipped on the expansion element. When compressing the cores with their respective front ends by means of a pneumatic or hydraulic device or with a corresponding manipulator, the expansion element spreads, where it has no flats, an annular projection of that part, into which it is inserted. As a result, this part or this projection expands relative to the surrounding wall of the other part, so that a force-locking engagement results between the two engaged parts.

Finally, the known device for joining parts in the manner of a wedge acts in the first place exclusively on two sides upon the areas being expanded, so that as a result of there developing stresses, it is not uncommon that material breakage occurs on the parts being joined. This occurs in particular in such cases, where the parts are brittle, fragile parts, as is the case with cores from molding sand.

It is therefore an object of the present invention to provide a device for joining all kinds of parts, which avoids the risk of damaging brittle or fragile parts to the greatest extent.

SUMMARY OF THE INVENTION

The above and other objects are achieved with the present invention by the provision of a clamping member which is provided between the connecting areas of the parts, and which exerts a clamping effect when and as a result of the parts being inserted into one another.

In an advantageous manner, it has been recognized that it is possible to join with simple means all kinds of parts, in particular cores for forming a core assembly, wherein between engageable connecting areas of the parts, a clamping member is provided, which develops a clamping effect during the engagement. The parts are joined to one another solely as a result of being inserted into each other, and while being inserted into one another, namely because of the clamping effect resulting from the clamping member. Accordingly, the connecting areas of the parts are to be adapted to one another in their shape and size such that the clamping member fits inbetween. In the case of a full engagement of the connecting areas, the clamping effect resulting from the clamping member must be adequate.

In an advantageous manner, the connecting areas of the parts being joined to one another are made as male and female portions that fit into one another. In this connection, it is desired that the parts fit into one another at least largely by formfitting engagement. Each clamping member serves as an insert between two connecting areas, so that a clamping effect results, when the connecting areas engage each other. Provided the clamping members being used as inserts are made adequately soft, it will be possible to reduce the clamping force to a minimum, so that damage to the parts is avoided to the greatest extent.

Within the scope of a particularly suitable configuration of the connecting areas, the connecting area of the one part is realized as a cone or frustrum, and the connecting area of the other part as a conical or frustoconical recess. Many other shapes are possible. In this instance, one will always have to make sure that the connecting areas of the parts fit into one another at least largely in a formfitting manner.

If the connecting areas are realized as cones or frustrums and as corresponding recesses, their respective circumferential surface may have different angles. In this connection, it has been shown that in the case of an only extremely small angle of inclination of the circumferential surface, a particularly satisfactory and adequate connection results because of a force-locking engagement. An adaptation to the respective conditions of the parts being joined is possible.

Specifically, the clamping member may be realized such that it is made as a moldable flat layer or sheet, which is adapted for being placed or slipped at least in certain regions onto the connecting area serving as the male portion, and/or for being placed or inserted at least in certain regions into the connecting area serving as the female portion. For example, the sheet could be realized as a closed or open sleeve. Preferably, this sleeve is adapted to the shape of the connecting area. Likewise, it would be possible to realize the sheet or the clamping member as a closed or open ring, which is inserted or slipped at least in certain regions over the connecting area used as the male portion. Both within the scope of a realization as a sleeve and within the scope of a realization as a ring, the clamping member could be open, so that an adaptation to different diameters of the connecting areas is easily possible. At any rate, it is important that with the cooperation of the clamping member, a force-locking engagement results between the connecting areas of the parts being joined. As a result, the parts are interconnected in a gentle manner.

Within the scope of a very particularly advantageous development, it will be of advantage, when the sheet forming the clamping member is adapted for being placed on the free end of the connecting area serving as the male portion, or over the opening of the connecting area serving as the female portion, and adapted for being pulled or pushed in between the connecting areas, when engaging same, until an adequate clamping effect is generated. Insofar, a very simple clamping member would be created, which is pulled into the space between the connecting areas, while engaging the connecting areas. In this connection, a resultant formation of folds will not necessarily interfere. Quite the contrary, such a formation of folds will contribute to the clamping effect, so that a force-locking engagement is attained all around, when the connection areas are engaged.

Within the scope of such a simple embodiment, it will be of further advantage when the sheet is made at least generally circular, and serrated, fringed, or star-shaped in its edge portion. In this respect it is possible to avoid mutual overlapping with an adequately deep incision, so that stress peaks that destroy the parts do just not occur at all. The serrated, fringed, or star-shaped configuration may be realized in that the circular sheet is provided not only with incisions, but that also cutouts are formed, so that the remaining surface of the sheet adapts itself all around between the connecting areas to the surface thereof, without these adapting portions of the layer overlapping one another. Many other configurations or shapes of the clamping members are possible.

To enable a reliable positioning of the clamping member in the form of a flat sheet, in particular within the scope of an overhead installation, or to secure it against an air draft, it would be possible to provide the clamping member or the sheet forming the clamping member with an adhesive. The adhesive would then serve to secure the clamping members to the connecting area forming the male portion. It would also be possible to apply there an adhesive or glue at a later time. Likewise, it is possible that the clamping members or the sheet be inserted or pushed in at least slightly or in part into the connecting area serving as the female portion, so that then occurring frictional forces cause the clamping member to adhere already safely, until the connecting area forming the male portion is finally inserted into the female portion, with the clamping member generating the actual clamping effect between the two connecting areas.

As previously mentioned, it will be of special advantage, when the clamping member is made of a soft material that is at least largely adaptable to the shape of the connecting areas, so that the clamping member adapts itself to all kinds of shapes of the connecting areas. In this connection, the clamping member should be made adequately thick, so as to be able to absorb into itself, during the joining of core assemblies, at least in part, the smallest particles, for example, core sand particles. On the one hand, this measure creates an adequate connection between the parts being joined, and on the other hand, it prevents a "loose gravel effect," which commonly occurs with cores. This effect causes sand to be abraded during the joining of cores, when the cores mutually slide against one another, and it complicates or even precludes, in the form of sand beads, an adequate engagement of the parts. Consequently, the use of the clamping member in accordance with the invention allows a further problem that has arisen until now to be effectively avoided.

In a particularly advantageous manner, the clamping member may be used for compensating increasing wear on molds, namely for maintaining or restoring the required accuracies of fit of male and female portions. In this respect, it is possible to make the clamping member thicker in the case of increasing wear on molds, so that the thicker clamping material is able to restore the necessary accuracy of fit at least to a certain extent. At any rate, it would be possible to use in the case of increasing wear on the molds, increasingly thicker clamping members for compensating problems resulting from wear.

At this point, it should be noted that one can counteract wear of critical mold regions by hard metal inserts, so that yet again a very special function is attached to the clamping members, namely that of avoiding once more or reducing at least the wear on the molds.

The clamping member could be made of cellulose or the like. Within the scope of an especially simple realization, paper or cardboard is used. The costs of such a clamping member may be minimized accordingly.

Further, it is also possible to make the clamping members of plastic or even of a soft metal, depending on the underlying problem. In any case, it is essential that an adaptation in terms of shape to the connecting areas be possible. The use of an adequately soft material should permit a penetration of the smallest particles.

To assist the necessary clamping effect between the connecting areas, it will likewise be of advantage, when the clamping member is configured to be non-smooth on at least one of the two surfaces. Thus, it would be possible to emboss the clamping member or provide it with scales or the like.

Furthermore, it is possible to coat the clamping member on at least one side. Should the material of the clamping member not be adequately soft, one could there provide a soft coating. Likewise, it would be possible to use as coating an adhesive, so that the particles can be bonded initially by the adhesive. In this instance, the coating of adhesive could realize an adhesive bond in addition to the actual clamping effect.

Within the scope of a particularly refined development, the material of the clamping member could be a material of the kind which expands in a defined manner. Thus, one could use, for example, a material that expands at certain temperatures or certain air humidities, so that a repeated clamping of the parts occurs by a subsequent expansion of the clamping member only in the engaged state of the connecting areas, or in addition to the clamping effect developing during the engagement.

BRIEF DESCRIPTION OF THE DRAWINGS

There exist various possibilities of improving and further developing the teaching of the present invention in an advantageous manner. To this end, one may refer to the following description of two embodiments of the invention with reference to the drawings, wherein generally preferred improvements and further developments of the teaching are described in greater detail. In the drawings.

DETAILED DESCRIPTION OF THE PREFERRED EMBODIMENTS

Figure 1:
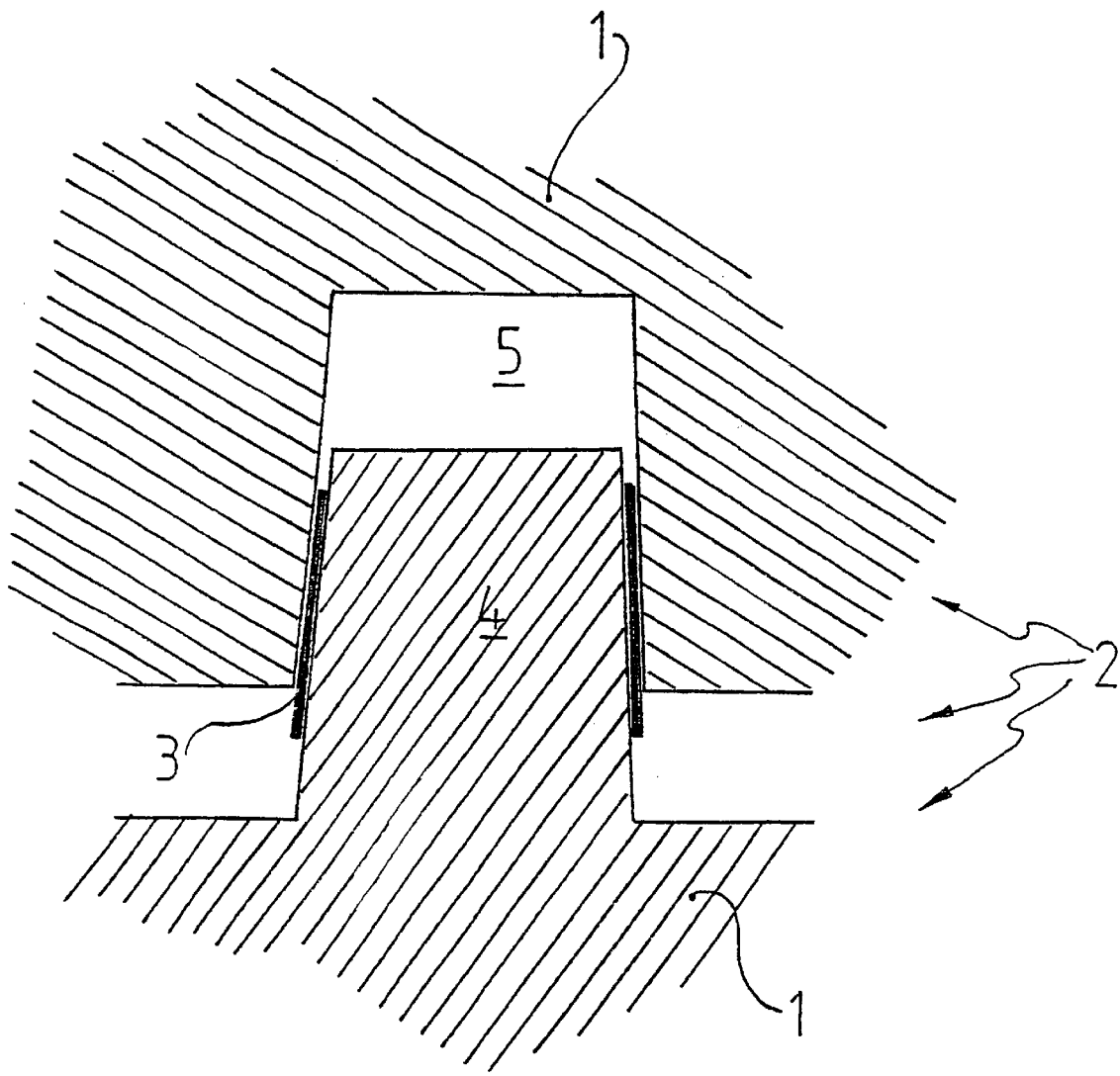
FIG. 1 is a schematic sectional side view of an embodiment of a device according to the invention, wherein a paper sleeve serving as a clamping member is inserted between the connecting areas of two cores.

In the embodiment shown in FIG. 1, the device of the present invention is used to join two cores 1, of the type used for forming a core assembly used in foundry practice. The cores 1 are joined to each other via a connecting area 2 formed in certain regions, so that the cores 1 are effectively interconnected as a result of inter-engaging connecting areas 2.

In accordance with the invention, the actual joining occurs in a force-locking manner, in that between the connecting areas 2 of the cores 1, a clamping member 3 is provided, which develops a clamping effect, when the connecting areas 2 engage each other.

As can further be noted from FIG. 1, the connecting areas 2 are realized as a male portion 4 fitting into a female portion 5.

The connecting area 2 (male portion 4) of the one core 1 is designed and constructed as a frustrum and the connecting area 2 (female portion 5) of the other core 2 is realized as a frustoconical recess, with both connecting areas 2 being adapted to each other in a formfitting respect. Without the use of a clamping member 3, it would not be possible to join the two areas, at least not within the scope of the configuration according to the invention.

As can further be noted from FIG. 1, the frustoconical connecting area 2, and accordingly the complementary recess of the other connecting area 2 have only an extremely small angle of inclination of their circumferential surface. Between the two connecting areas 2, the clamping member 3 is arranged, which is slipped over the frustrum before joining the two cores 1.

In the embodiment of FIG. 1, the clamping member 3 is designed and constructed as a frustoconical sleeve, which surrounds at least in part the connecting area 2 of the one core 1. Other configurations are possible.

Figure 2:
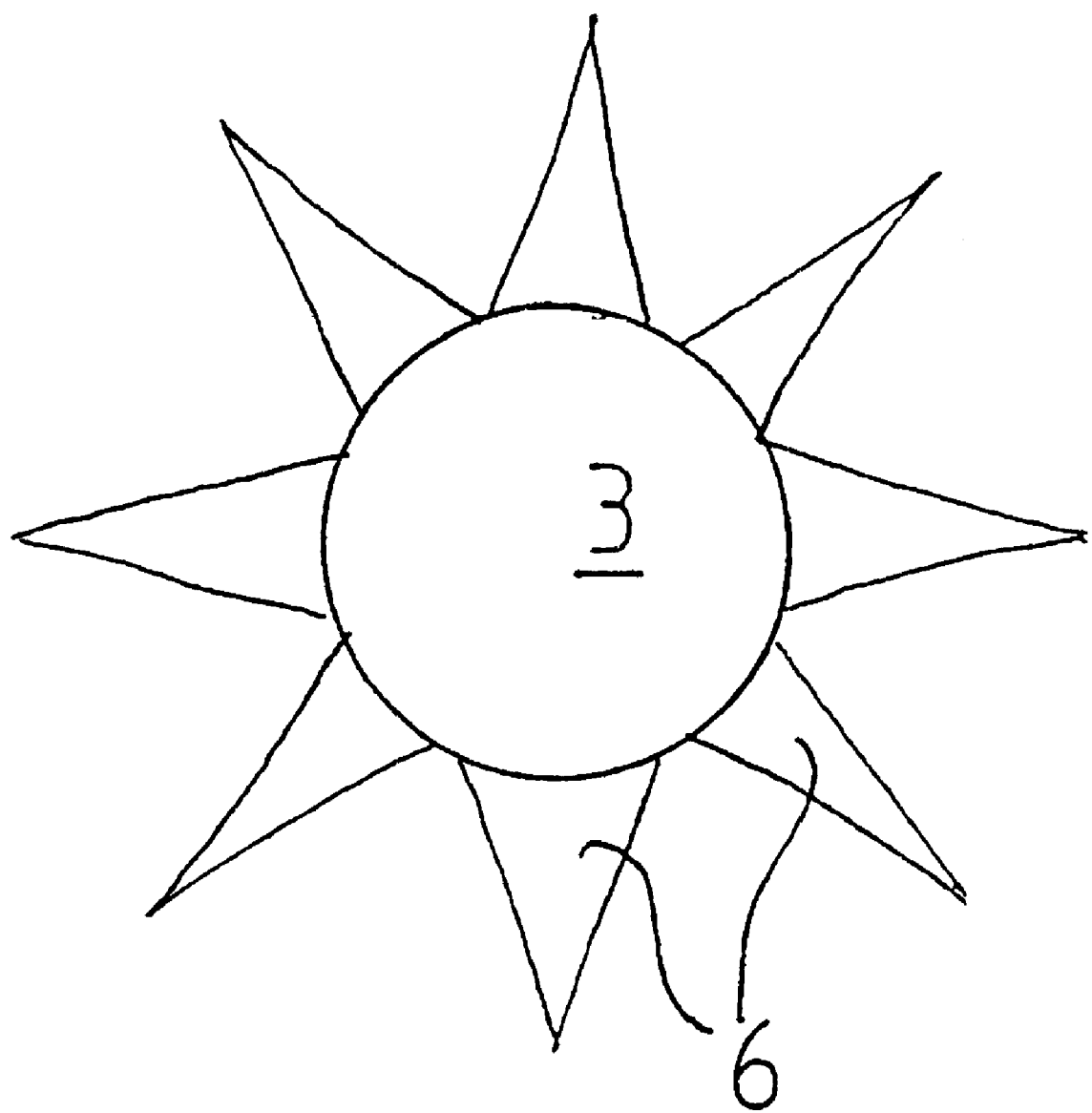
FIG. 2 is a schematic top view of an embodiment of a clamping member in the form of a star-shaped sheet of paper, which is forcibly pulled in between the connecting areas during an engagement of the connecting areas.

FIG. 2 shows an alternative configuration of the clamping member 3 to the extent that the clamping member 3 is adapted for being placed as a layer in the form of a sheet of paper on the free end of the connecting area 2 serving as the male portion 4 or over the opening of the connecting area 2 serving as the female portion 5, and for being pulled or pushed in between the connecting areas 2, while engaging the connecting areas 2, until an adequate clamping effect is generated. In this respect, a very special realization of the clamping member 3 presents itself, namely that of a circular design, which is made star-shaped in its edge portion, so that during the engagement of connecting areas 2, triangular teeth 6 forming the edge portion come to contact the circumferential surface of the frustrum without overlapping. This permits effectively avoiding stress peaks as occur by overlapping, which may ultimately lead to a breakage of the parts being joined.

In a selected embodiment, the clamping member 3 is made of an adequately soft paper, with the paper being made adequately thick, so that particles of core sand separating from the cores 1 can press themselves into the paper, thereby effectively avoiding a "loose gravel effect", while engaging the connecting areas 2.

As regards further, alternative developments of the claimed teaching, the description of the general part of the specification is herewith incorporated by reference, for the purpose of avoiding repetitions.

Finally, it should be noted that the above-described embodiment serves only to explain the claimed teaching, without however limiting the invention to the disclosed embodiments.

What is claimed is:

1. A core assembly adapted for use in foundry practice comprising a plurality of cores, with the cores being joined together by at least one connecting area which comprises a male portion integrally formed on one of the joined cores and a female portion integrally formed on the other of the joined cores, with the male portion being closely received in the female portion, and a clamping member positioned between the male and female portions of the connecting area to produce a clamping effect therebetween, and wherein said clamping member comprises a formable initially flat sheet which is adapted for being placed on the male portion or placed over the female portion so as to conform to the shape of the connecting area and develop said clamping effect during the insertion of the male portion into the female portion.

2. The core assembly as defined in claim 1 wherein the male portion is in the form of a cone or frustum, and the female portion is in form of a conical or frustoconical recess.

3. The core assembly as defined in claim 2 wherein the cone or frustrum of the male portion has an extremely small angle of inclination of its circumferential surface.

4. The core assembly as defined in claim 1 wherein the formable initially flat sheet comprises a generally circular center portion and a serrated or star shaped outer edge portion.

5. The core assembly as defined in claim 4 wherein the outer edge portion of the flat sheet is star shaped and formed by triangular segments which radiate from the center portion, with the triangular segments being configured so as not to overlap when conformed to the shape of the connecting area.

6. The core assembly as defined in claim 1 wherein the clamping member comprises a soft material that is essentially conformable to the shape of the connecting area.

7. The core assembly as defined in claim 1 wherein the clamping member comprises a sheet which is sufficiently thick to receive therein small core sand particles.

8. The core assembly as defined in claim 7 wherein the sheet is composed of a material selected from the group consisting of cellulose, paper, cardboard, plastic, and soft metal.

9. The core assembly as defined in claim 7 wherein the sheet is configured to be non-uniform on at least one of its two opposite surfaces.

10. The core assembly as defined in claim 7 wherein the sheet has a coating on at least one of its two opposite surfaces.

11. The core assembly as defined in claim 10 wherein the coating is a soft material.

12. The core assembly as defined in claim 10 wherein the coating is an adhesive.

13. The core assembly as defined in claim 1 wherein the sheet comprises a material which is expandable in a defined manner at certain temperatures or humidities.

* * * * *